United States Patent
Jeon et al.

(10) Patent No.: US 9,053,521 B2
(45) Date of Patent: Jun. 9, 2015

(54) IMAGE PROCESSING APPARATUS AND METHOD

(75) Inventors: Young-Sun Jeon, Yongin-si (KR); Ho Jin Lee, Seoul (KR); Joon Hyuk Cha, Incheon (KR); Shi Hwa Lee, Seoul (KR); Young Su Moon, Seoul (KR); Hyun Sang Park, Chungcheongnam-do (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 969 days.

(21) Appl. No.: 12/929,020

(22) Filed: Dec. 22, 2010

(65) Prior Publication Data

US 2011/0164833 A1 Jul. 7, 2011

(30) Foreign Application Priority Data

Jan. 6, 2010 (KR) ........................ 10-2010-0000807

(51) Int. Cl.
    G09G 5/36 (2006.01)
    G06F 15/16 (2006.01)
    G06F 15/167 (2006.01)
    G06T 1/00 (2006.01)

(52) U.S. Cl.
    CPC ....................... *G06T 1/00* (2013.01)

(58) Field of Classification Search
    CPC ........................ G11C 7/1015; G06T 2210/52
    USPC .......... 345/501, 502, 505, 530, 531, 541, 560
    See application file for complete search history.

(56) References Cited

U.S. PATENT DOCUMENTS

| 6,163,828 | A  | * | 12/2000 | Landi et al. ................... 710/240 |
| 6,173,388 | B1 | * | 1/2001  | Abercrombie et al. .......... 712/22 |
| 6,798,420 | B1 | * | 9/2004  | Xie ................................ 345/554 |
| 6,853,382 | B1 | * | 2/2005  | Van Dyke et al. ............. 345/544 |
| 7,474,313 | B1 | * | 1/2009  | Bittel et al. .................... 345/531 |
| 7,529,139 | B2 |   | 5/2009  | Huang et al. |

FOREIGN PATENT DOCUMENTS

| JP | 9-55958        | 2/1997  |
| JP | 11-328976      | 11/1999 |
| JP | 2000-242549    | 9/2000  |
| JP | 2007-128640    | 5/2007  |
| KR | 10-2002-0059716 | 7/2002 |
| KR | 10-2004-0034711 | 4/2004 |
| KR | 10-2007-0019807 | 2/2007 |
| KR | 10-2007-0070746 | 7/2007 |
| KR | 10-2008-0079551 | 9/2008 |

* cited by examiner

Primary Examiner — Joni Richer
(74) Attorney, Agent, or Firm — Staas & Halsey LLP

(57) ABSTRACT

An image processing apparatus is provided. The image processing apparatus for image signal processor (ISP) realization may include a Static Random Access Memory (SRAM) for each function module. A unified SRAM to store at least one line data of an input image for each of a plurality of functions modules within the image processing apparatus is further provided.

16 Claims, 6 Drawing Sheets

IMAGE PROCESSING APPARATUS AND METHOD

CROSS-REFERENCE TO RELATED APPLICATIONS

This application claims the priority benefit of Korean Patent Application No. 10-2010-0000807, filed on Jan. 6, 2010, in the Korean Intellectual Property Office, the disclosure of which is incorporated herein by reference.

BACKGROUND

1. Field

One or more embodiments of the present disclosure relate to a hardware structure of an image signal processor (ISP), and more particularly, to a structure and an operation method of a memory installed within the ISP to store line data, for example, a Static Random Access Memory (SRAM).

2. Description of the Related Art

Many functions may be performed by an image signal processor (ISP). For example, the functions may include bad pixel replacement, red, green, blue (RGB) interpolation, noise reduction, edge enhancement, and the like.

Since each of the functions deals with a two-dimensional (2D) image, image data corresponding to some line amounts may be temporarily stored in a memory. For example, when a 3×3 bilinear interpolation is performed, a 3×3 kernel may be used. Therefore, in addition to a current line, two lines prior to the current line may be stored in the memory.

However, most of hardwired ISP costs may be used for a Static Random Access Memory (SRAM). ISPs are used more and more to process high resolution images and an amount of required SRAM may increase proportionally with an increase in image resolution.

Accordingly, there is a desire for a method that may reduce costs used for the SRAM within the ISP, that is, a silicon area.

SUMMARY

According to an aspect of one or more embodiments, there may be provided an image processing apparatus, including a plurality of function modules, each to perform image processing of an input image, a memory to store at least one line data of the input image for the image processing performed by each of the function modules, and a memory controller to control recording and extraction of the at least one line data of the input image.

The memory may correspond to a unified Single Port Static Random Access Memory (SPSRAM) configured to store the at least one line data of the input image for image processing of each of the function modules.

When a number of the function modules is N where N denotes a natural number, a number of lines accessed by an $i^{th}$ function module among the plurality of function modules is $L_i$ where i denotes a natural number from zero to N−1, and each pixel data processed by the $i^{th}$ function module has $P_i$ bits, a minimum value of a bit width of the memory may be a sum of $((L_i-1) \times P_i \times 2)$ from a case where i is zero to a case where i is N−1.

When a horizontal resolution of the input image is H where H denotes a natural number and the $i^{th}$ function module operates after $D_i$ data accesses after an operation of an $(i-1)^{th}$ function module where $D_0=0$, a minimum value of a total number of clocks where the memory controller performs an access to the memory may be a value obtained by adding H to a sum of $2 \times D_i$ from the case where i is zero to the case where i is N−1.

An address assigned from the memory controller to the memory in a $j^{th}$ clock among the clocks may correspond to a quotient obtained by dividing j by H, and j denotes a natural number.

The memory controller may extract the at least one line data of the input image for image processing of each of the function modules, in an even clock among the clocks, and may record the at least one line data of the input image for image processing of each of the function modules in an odd clock among the clocks.

The memory controller may initiate a memory access for the $i^{th}$ function module after $2 \times D_i$ clocks after initiating a memory access for the $(i-1)^{th}$ function module, and may terminate the memory access after $(2 \times D_i + H)$ clocks.

The image processing apparatus may include k sets of the function modules in parallel and k denotes a natural number greater than or equal to 2. The unified SPSRAM may store the at least one line data of the input image for image processing of each of the parallel k sets.

A basic unit of the data access of the memory may be $2^M \times P_i$, and M denotes an integer greater than or equal to zero.

The plurality of function modules may include at least one of a noise reduction module, a bilinear interpolation module, and an edge enhancement module.

According to another aspect of one or more embodiments, there may be provided an image processing method, including performing, by a first function module among a plurality of function modules of an image processing apparatus, first image processing using a unified memory configured to store at least one line data of an input image, and performing, by a second function module among the plurality of function modules, second image processing using the unified memory.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
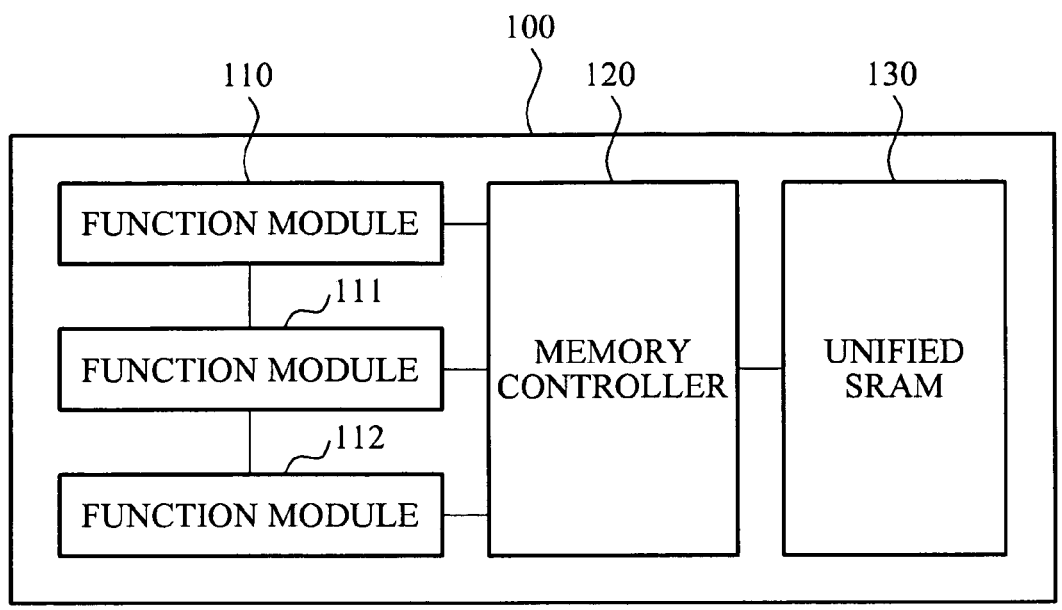
FIG. 1 illustrates an image processing apparatus according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an image processing apparatus 100 according to an embodiment.

The image processing apparatus 100 may include a plurality of function modules 110, 111, and 112 to perform a plurality of image processing operations, for example, a plurality of filtering operations with respect to an input image.

The plurality of function modules 110, 111, and 112 may perform general image signal processing, which is used in an image signal processing (ISP) field, and may include, for example, a noise reduction module, a bilinear interpolation module, an edge enhancement module, and the like.

The above specific filter is only an example and thus any type of functions or filters known in the ISP field may be used without departing from the scope of claims.

For example, the function module 110 may be a noise reduction filter having a size of 5×5, the function module 111 may be a color interpolation filter having a size of 3×3, and the function module 112 may be an edge enhancement filter having a size of 3×3.

For filtering of the function modules 110, 111, and 112, a memory (not shown) to store line data of the input image may be used.

In a conventional ISP system, a separate line memory is provided for each of the function modules. The line memory may use a Static Random Access Memory (SRAM), for example, a Single Port Static Random Access Memory (SPSRAM), a Double Port (DPSRAM), and the like.

When each of the function modules uses a separate line memory, as in a conventional ISP system, a silicon area may be used redundantly due to duplication of a memory core logic.

Therefore, according to an embodiment, a memory access used by all of the function modules 110, 111, and 112 may be processed by a single unified memory.

The unified memory may correspond to a unified SRAM 130 of FIG. 1, and more particularly, may be a unified SPSRAM. However, this is only an example and thus various types of memories may be employed.

An image typically used in the ISP field is now becoming a high resolution image. For example, an image having a horizontal resolution of 1024 pixels, 2048 pixels, or more than 2048 pixels is being processed.

In an image processing apparatus for ISP realization, most of the hardwired ISP costs may be used for an SRAM. For image processing, an access may be performed by storing line data of the input image in the SRAM. In this instance, when a resolution of the input image increases, a complexity of logic circuits of function modules, for example, the function modules 111, 112, and 113 may not necessarily increase. However, an area of the SRAM used may increase to be in proportion to the horizontal resolution of the input image and thus the access may be performed by storing the line data of the input image in the SRAM.

Accordingly, the unified SRAM 130 storing line data for the entire operation of the function modules 110, 111, and 112 may be selected and thus a relatively large silicon area may be saved compared to an example in which a separate SRAM is installed in each module.

A memory controller 120 may control the unified SRAM 130 to enable each of the function modules 110, 111, and 112 to access the unified SRAM 130 for respective corresponding operations. In this case, the memory controller 120 may control extraction and recording of line data for each of the function modules 110, 111, and 112 to be suitable for the entire ISP operation flow. In one or more embodiments the memory controller 100 is a processor or other hardware-based device.

According to an embodiment, the image processing apparatus 100 for an ISP operation of processing an input image having a horizontal resolution of H may include N function modules from a zero$^{th}$ function module to an $(N-1)^{th}$ function module. N denotes a natural number.

For an operation of an $i^{th}$ function module among the N function modules, $L_i$ line data each having a $P_i$-bit width may be used. A corresponding memory operation may be initiated after $2 \times D_i$ clocks compared to a memory operation for an $(i-1)^{th}$ function module, and may be terminated after $(2 \times D_i + H)$ clocks. Here, $0 \leq i \leq (N-1)$ and i denotes an integer.

Also, $D_0=0$. For the zero$^{th}$ function module that initially operates, the memory controller 120 may operate the unified SRAM 130 in a first clock.

A minimum value of a bit width of the unified memory may be calculated according to Equation 1.

$$\sum_{i=0}^{N-1}(L_i - 1) \cdot P_i \cdot 2 \qquad \text{Equation 1}$$

In Equation 1, since remaining lines excluding a current line are simultaneously accessed, "1" may be subtracted from "$L_i$". Since two pixel data is read or written at one time in an example of the unified SPSRAM, "2" may be multiplied with "$P_i$". A minimum value of a total number of clocks where a memory operates may be calculated according to Equation 2.

$$H + \sum_{i=0}^{N-1} D_i \cdot 2 \qquad \text{Equation 2}$$

An address A[j] assigned to a memory in a $j^{th}$ clock may be expressed by Equation 3.

$$A[j]=(j>>1)\%(H>>1) \qquad \text{Equation 3}$$

When A[j]%2=0, a corresponding clock may be an even clock and thus a read operation may be performed. When A[j]%2=1, the corresponding clock may be an odd clock and thus a write operation may be performed.

Hereinafter, to enhance understanding of a controlling process, by the memory controller 120, the unified SRAM 130 will be described by assuming the function modules 110, 111, and 112 act as specific filters.

In the above example, the function module 110 corresponding to the zero$^{th}$ function module among three function modules 110, 111, and 112 may be a two-dimensional (2D) filter having a size of 5×5 and may have individual pixel data of 10 bits. Specifically, $P_0=10$ and $L_0=5$.

The function module 111 corresponding to a first function module may be a 2D filter having a size of 3×3 and may have individual pixel data of 10 bits. Specifically, $P_1=10$ and $L_1=3$.

The function module 112 corresponding to a second function module may be a 2D filter having a size of 3×3 and may have individual pixel data of 8 bits. Specifically, $P_2=8$ and $L_2=3$.

A horizontal valid section H corresponding to the horizontal resolution of the input image=16 and a horizontal synchronization section=8.

According to Equation 1, the minimum value of the bit width of the unified SRAM 130 may be calculated as $(5-1) \times 10 \times 2+(3-1) \times 10 \times 2+(3-1) \times 8 \times 2=152$ bits.

A memory operation for an operation of the zero$^{th}$ function module, for example, the function module 110 may be performed from a zero$^{th}$ clock ($D_0=0$). A memory operation for an operation of the first function module, for example, the function module 111 may be performed from a fourth clock ($D_1=2$). A memory operation for an operation of the second function module, for example, the function module 112 may be performed from a sixth clock ($D_1=1$).

Specifically, for the operation of the function module 110, the memory controller 120 may repeat an operation of reading 80-bit data in an even clock and writing the 80-bit data in an odd clock, starting from the zero$^{th}$ clock.

For the operation of the function module 111, the memory controller 120 may repeat an operation of reading 40-bit data in an even clock and writing the 40-bit data in an odd clock, starting from the fourth clock.

For the operation of the function module 112, the memory controller 120 may repeat an operation of reading 32-bit data in an even clock and writing the 32-bit data in an odd clock, starting from the sixth clock.

The above process will be further described with reference to FIG. 2.

Figure 2:
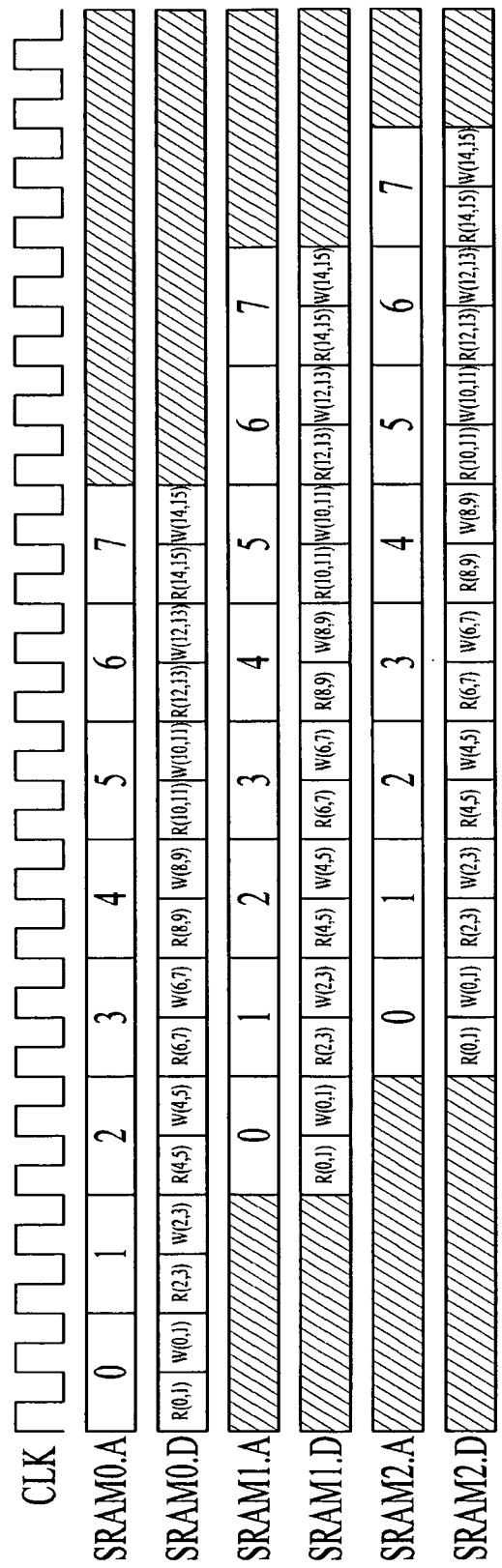
FIG. 2 illustrates a diagram to describe extraction and recording of line data when a different Static Random Access Memory (SRAM) is used for each of function modules according to a prior art.

FIG. 2 illustrates a diagram to describe extraction and recording of line data when different SRAMs are used for respective function modules according to the related art.

In the related art, three SRAMs, for example, SRAM0, SRAM1, and SRAM2 may be provided for three respective function modules.

As shown in FIG. 2, an operation of reading two pixel data and an operation of writing two pixel data at one time are alternately performed for the three function modules.

In the following figures, "SRAM i. A" denotes a unitary SRAM address assigned to an i$^{th}$ filter. R(x, y) denotes all the data that needs to be read for processing an x$^{th}$ pixel and an y$^{th}$ pixel. Also, W(x, y) denotes all the data that needs to be written for processing an x$^{th}$ pixel and an y$^{th}$ pixel of a subsequent line. Each of x and y denotes an integer greater than or equal to zero.

Referring to FIG. 2, R(x, y) may be repeatedly performed in even clocks and W(x, y) may be repeatedly performed in odd clocks.

For a first function module, SRAM0 may operate from a zero$^{th}$ clock. For a second function module, SRAM1 may operate from a fourth clock. For a third function module, SRAM2 may operate from a sixth clock.

An address of each of the SRAMs, that is, SRAM0, SRAM1, and SRAM2 may be repeated from zero to 7 with respect to each operation.

In a memory access, an absolute address may be unimportant and a relative address may be important. In the case of pixel data continuous within single line data, an address where first pixel data is stored may not become an issue as far as continuity of pixel data is maintained.

Accordingly, an example of changing an absolute address to be the same for each clock will be described with reference to FIG. 3.

Figure 3:
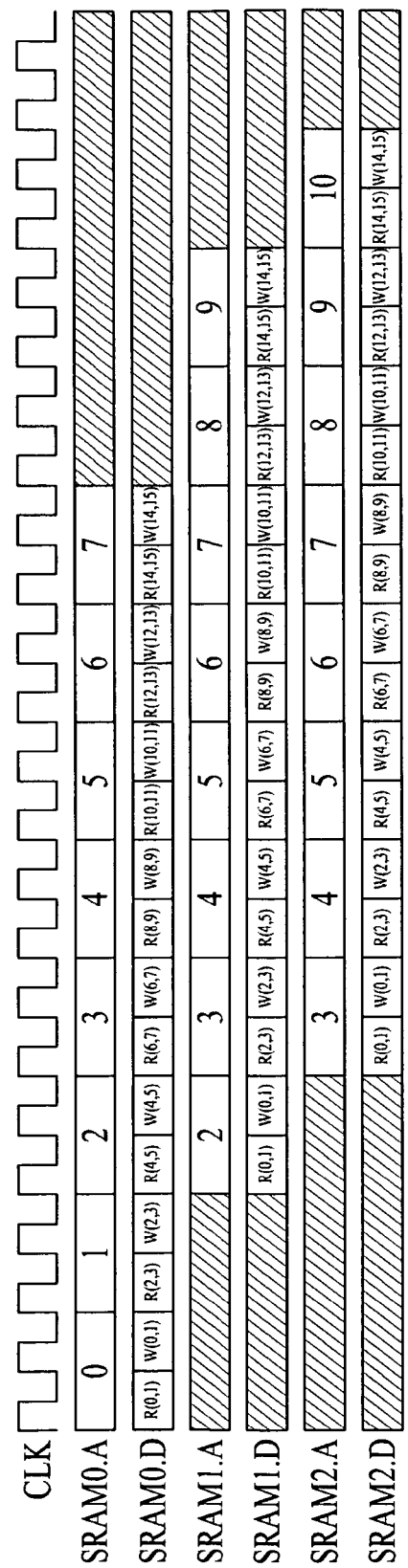
FIG. 3 illustrates a process of matching a memory address accessed in FIG. 2 to use a unified SRAM for a plurality of function modules according to the prior art.

FIG. 3 illustrates a process of matching a memory address accessed in FIG. 2 to use a unified SRAM for a plurality of function modules.

In FIG. 3, an individual SRAM may be provided for each of three function modules. In SRAM1, address 0 where R(0, 1) is performed is changed to address 2. In SRAM1, address 0 where W(0, 1) is performed is changed to address 3 and remaining addresses are sequentially changed to respective corresponding addresses.

The same description may be applied to SRAM2. In SRAM2, address 0 where R(0, 1) is performed is changed to address 3 and following addresses are also sequentially changed to respective corresponding addresses.

Through the above process, when a single unified SRAM is introduced, a plurality of line data may be accessed.

Figure 4:
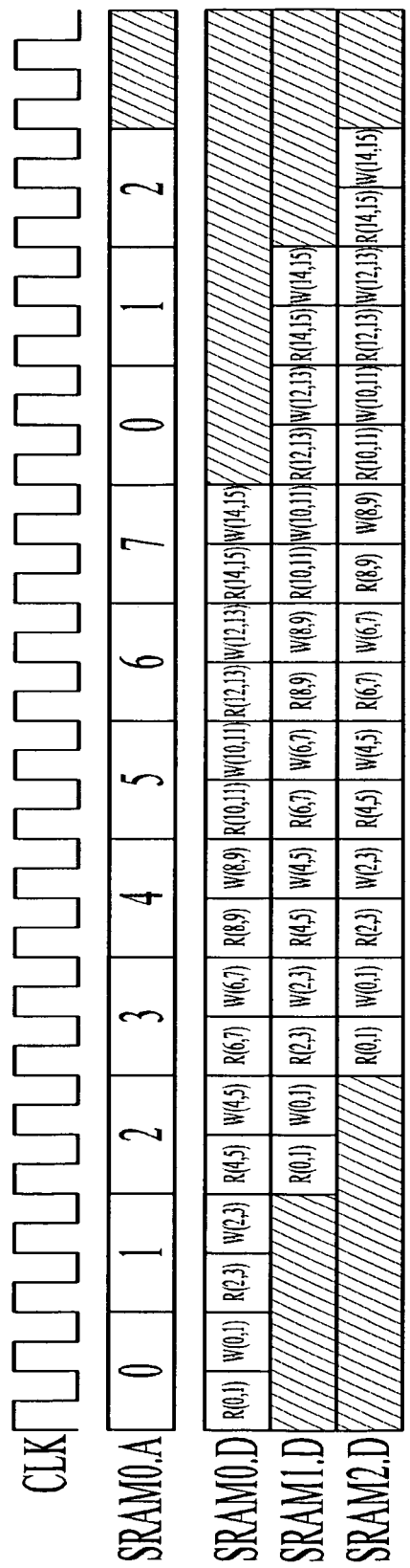
FIG. 4 illustrates a diagram to describe extraction and recording of line data when a unified SRAM is used for a plurality of function modules according to an embodiment.

FIG. 4 illustrates a diagram to describe extraction and recording of line data when a unified SRAM is used for a plurality of function modules according to an embodiment.

Referring to FIG. 4, SRAM0, SRAM1, and SRAM2 of FIGS. 2 and 3 are unified into the single unified SRAM, for example, the unified SRAM 130 of FIG. 1. A minimum bit width of the unified SRAM may be calculated according to FIGS. 1 through 3, Equation 1, and the like.

SRAM0.0.D corresponds to a portion allocated for a first function module, SRAM0.1.D corresponds to a portion allocated for a second function module, and SRAM0.2.D corresponds to a portion allocated for a third function module.

As described above with reference to FIG. 3, address SRAM0.A may be applied to be alike with respect to the three function modules. In this instance, a start timing of a memory access may be different for each of the function modules.

Since the unified SRAM is introduced, and the memory controller controls a data access between the unified SRAM and the function modules, the image processing apparatus may significantly decrease a memory area compared to a case where individual SRAMs are provided for the respective function modules.

Figure 5:
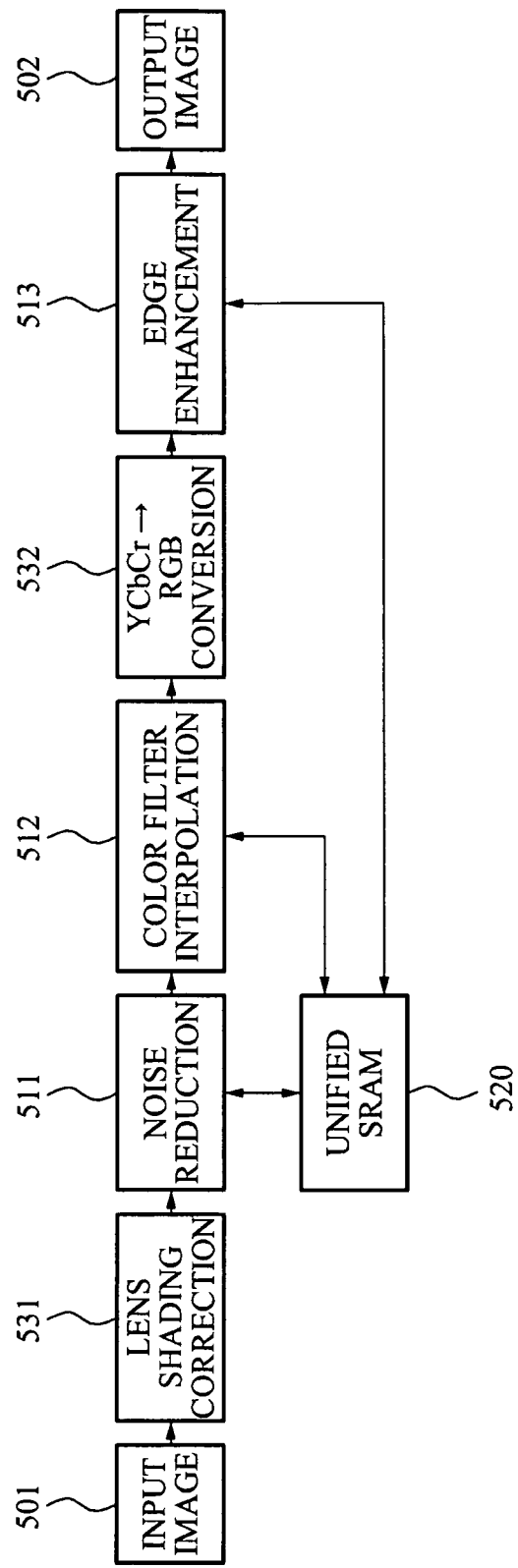
FIG. 5 illustrates a plurality of function modules and a unified SRAM according to an embodiment.

FIG. 5 illustrates a plurality of function modules and a unified SRAM 520 according to an embodiment.

When an input image 501 is input into an image processing apparatus, noise reduction 511 corresponding to a first function module may be performed through a lens shading correction 531. During this process, line data access with respect to the unified SRAM 520 may be performed.

A color filter interpolation 512 corresponding to a second function module may be performed. During this process, a line data access with respect to the unified SRAM 520 may be performed.

A YCbCr to red, green, blue (RGB) conversion 532 that is a conversion from a YCbCr color system to an RGB color system may be performed with respect to image data.

An edge enhancement 513 corresponding to a third function module may be performed. During this process, a line data access with respect to the unified SRAM 520 may be performed.

A line data access timing between the noise reduction 511 and the unified SRAM 520, a line data access timing between the color filter interpolation 512 and the unified SRAM 520, and a line data access timing between the edge enhancement 513 and the unified SRAM 520 are shown in FIG. 4.

The preceding types of specific function modules, ISP flow, and memory access timings are only examples and thus other various applications may be employed without departing from the scope of the claims.

According to another embodiment, when the entire group excluding the unified SRAM 520 in the block diagram of FIG. 5 is a single ISP set, k ISP sets may be provided in parallel. In this instance, k denotes a natural number greater than or equal to 2.

For the entire function modules included in the parallel k ISP sets, a line data access may be performed using the unified SRAM 520. In this case, a vertical axis of the timing diagram of FIG. 4 may become k folds. A minimum value of a data bit width of the unified SRAM 520 may be calculated according to Equation 4 instead of using Equation 1.

$$k \sum_{i=0}^{N-1} (L_i - 1) \cdot P_i \cdot 2 \qquad \text{Equation 4}$$

According to still another embodiment, it is possible to increase, by $2^M$-fold, a basic unit of the memory access of the unified SRAM 520 to be $2^M \times P_i$. In this case, a configuration and an operation of the unified SRAM 520, and an operation of the memory controller may vary.

For example, a memory access frequency may decrease to be $\frac{1}{2}^M$ and thus a power consumption amount used by a memory access may also decrease to be about $\frac{1}{2}^M$.

Figure 6:
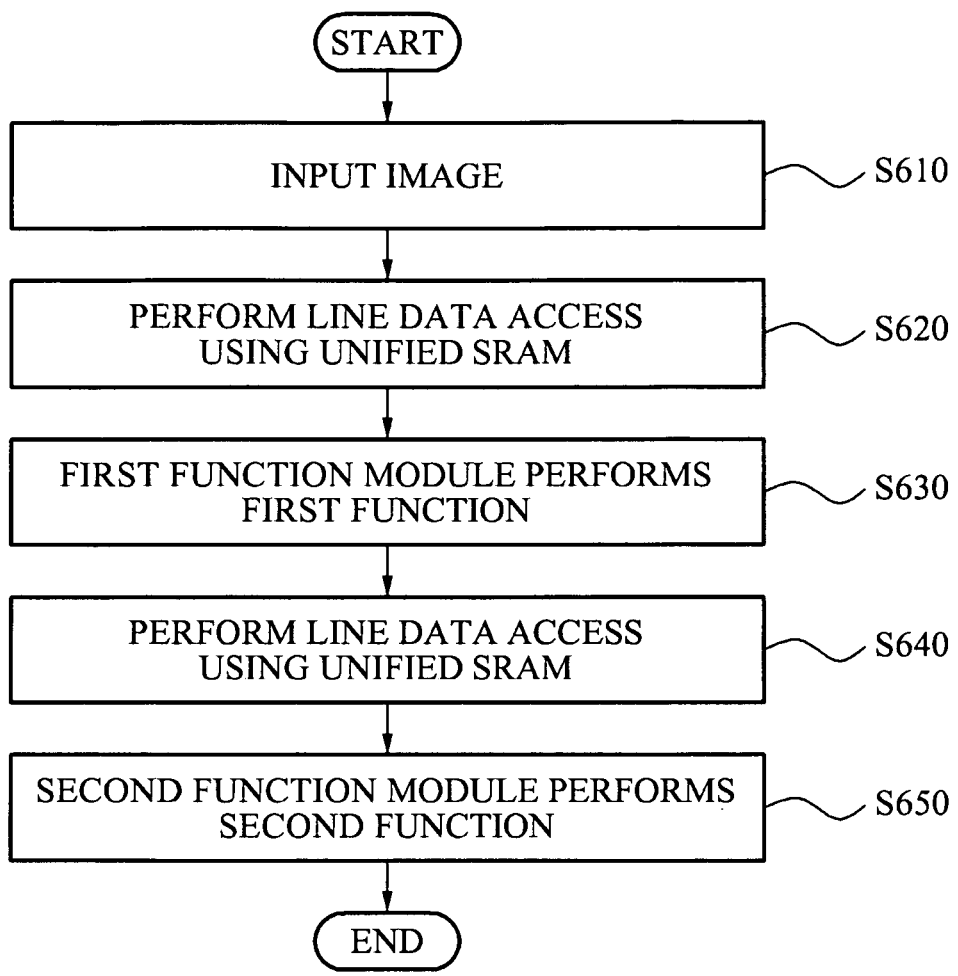
FIG. 6 illustrates an image processing method according to an embodiment.

FIG. 6 illustrates an image processing method according to an embodiment.

In operation S610, an image may be input. A horizontal resolution H of the input image may be an important factor in determining a specification of a unified SRAM.

A configuration of the unified SRAM in a case where a number N of function modules, a data access bit width $P_i$ for an operation of each function module, a data access delay $D_i$, and the like are determined is described above.

When the unified SRAM is configured as above, a line data access for a first function module to perform a first function using the unified SRAM may be performed in operation S620.

In operation S630, the first function module may perform the first function.

After the data access delay $D_i$, a line data access for a second function module to perform a second function using the unified SRAM may be performed in operation S640. In operation S650, the second function module may perform the second function.

The above process may be repeated with respect to the entire N function modules and a corresponding memory access operation timing is shown in FIG. 4.

The image processing method according to the above-described embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The instructions may be executed on any processor, general purpose computer, or special purpose computer such as an image processing apparatus.

The described hardware devices may be configured to act as one or more software modules in order to perform the operations of the above-described embodiments, or vice versa. The software modules may be controlled by any processor or computer. In addition, in some embodiments a computer-readable storage medium may be distributed among computer systems connected through a network and computer-readable codes or program instructions may be stored and executed in a decentralized manner.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing apparatus, comprising:
   a plurality of function modules, each to perform image processing of an input image;
   a memory to store at least one line data of the input image for the image processing performed by each of the function modules; and
   a memory controller to control recording and extraction of the at least one line data of the input image,
   wherein when a number of the function modules is N where N denotes a natural number, a number of lines accessed by an ith function module among the plurality of function modules is Li where i denotes a natural number from zero to N−1, and each pixel data processed by the ith function module has Pi bits, a minimum value of a bit width of the memory is a sum of (Li−1)×Pi×2 from a case where i is zero to a case where i is N−1.

2. The image processing apparatus of claim 1, wherein the memory corresponds to a unified Single Port Static Random Access Memory (SPSRAM) configured to store the at least one line data of the input image for image processing of each of the function modules.

3. The image processing apparatus of claim 2, wherein:
   the image processing apparatus comprises k sets of the function modules in parallel and k denotes a natural number greater than or equal to 2, and
   the unified SPSRAM stores the at least one line data of the input image for image processing of each of the parallel k sets.

4. The image processing apparatus of claim 1, wherein:
   when a horizontal resolution of the input image is H where H denotes a natural number and the ith function module operates after Di data accesses after an operation of an (i−1)th function module where D0=0, a minimum value of a total number of clocks where the memory controller performs an access to the memory is a value obtained by adding H to a sum of 2×Di from the case where i is zero to the case where i is N−1.

5. The image processing apparatus of claim 4, wherein an address assigned from the memory controller to the memory in a jth clock among the clocks corresponds to a quotient obtained by dividing j by H, and j denotes a natural number.

6. The image processing apparatus of claim 5, wherein the memory controller extracts the at least one line data of the input image for image processing of each of the function modules, in an even clock among the clocks, and records the at least one line data of the input image for image processing of each of the function modules in an odd clock among the clocks.

7. The image processing apparatus of claim 4, wherein the memory controller initiates a memory access for the ith function module after 2×Di clocks after initiating a memory access for the (i−1)th function module, and terminates the memory access after (2×Di+H) clocks.

8. The image processing apparatus of claim 1, wherein a basic unit of the data access of the memory is 2M×Pi, and M denotes an integer greater than or equal to zero.

9. The image processing apparatus of claim 1, wherein the plurality of function modules comprises at least one of a noise reduction module, a bilinear interpolation module, and an edge enhancement module.

10. An image processing method in an image processing apparatus having a memory controller, the method comprising:

performing, by a first function module among a plurality of function modules of an image processing apparatus, first image processing using a unified memory configured to store at least one line data of an input image, wherein the storing of the at least one line data is controlled by the memory controller; and performing, by a second function module among the plurality of function modules, second image processing using the unified memory, wherein when a number of the function modules is N where N denotes a natural number, a number of lines accessed by an ith function module among the plurality of function modules is Li where i denotes a natural number from zero to N−1, and each pixel data processed by the ith function module has Pi bits, a minimum value of a bit width of the unified memory is a sum of (Li−1)×Pi×2 from a case where i is zero to a case where i is N−1.

11. The image processing method of claim 10, wherein the unified memory corresponds to a unified SPSRAM for the plurality of function modules of the image processing apparatus.

12. The image processing method of claim 10, wherein:
when a horizontal resolution of the input image is H where H denotes a natural number and the ith function module operates after Di data accesses after an operation of an (i−1)th function module where D0=0, a minimum value of a total number of clocks where an access to the unified memory is performed while the N function modules perform image processing is a value obtained by adding H to a sum of 2×Di from the case where i is zero to the case where i is N−1.

13. The image processing method of claim 12, wherein an address assigned from a memory controller to a memory among the clocks corresponds to a quotient obtained by dividing j by H, and j denotes a natural number.

14. The image processing method of claim 13, wherein:
the at least one line data of the input image for image processing of each of the function modules is extracted in an even clock among the clocks, and the at least one line data of the input image for image processing of each of the function modules is recorded in an odd clock among the clocks.

15. The image processing method of claim 12, wherein a memory access for the ith function module among the N function modules is initiated after 2×Di clocks after initiating a memory access for the (i−1)th function module, and is terminated after (2×Di+H) clocks.

16. A non-transitory computer-readable medium comprising a program for instructing a computer to perform the method of claim 10.

* * * * *